United States Patent [19]

Hancock et al.

[11] Patent Number: 4,835,669

[45] Date of Patent: May 30, 1989

[54] DUAL MODE FLYBACK POWER SUPPLY

[75] Inventors: Donald J. Hancock, Thousand Oaks; Ronald R. Robson, Newbury Park, both of Calif.

[73] Assignee: Hughes Aircraft Company, Los Angeles, Calif.

[21] Appl. No.: 249,135

[22] Filed: Sep. 26, 1988

[51] Int. Cl.⁴ .......................................... H02M 3/335
[52] U.S. Cl. ........................................ 363/21; 363/56; 363/97
[58] Field of Search .................... 363/18–21, 363/56, 95, 97, 131

[56] References Cited

U.S. PATENT DOCUMENTS

| | | | |
|---|---|---|---|
| 3,740,639 | 6/1973 | Easter | 363/21 |
| 3,935,526 | 1/1976 | Kamata et al. | 363/21 |
| 4,374,355 | 2/1983 | Steigerwald et al. | 363/21 |
| 4,481,565 | 11/1984 | Colton | 363/56 |
| 4,562,523 | 12/1985 | Rodel et al. | 363/21 |
| 4,665,473 | 5/1987 | Onda et al. | 363/21 |
| 4,734,839 | 3/1988 | Barthold | 363/21 |

Primary Examiner—Peter S. Wong
Attorney, Agent, or Firm—Wanda K. Denson-Low; A. W. Karambelas

[57] ABSTRACT

A dual mode flyback power supply 10 capable of automatically transitioning between operational modes in response to changes in the impedance of a load 12 connected thereto. The dual mode power supply 10 of the present invention includes an input voltage source 15 for providing input voltage and current. The power supply 10 also includes a first transformer 20 having primary N1, secondary N2 and tertiary N3 windings for supplying a first current to a load 12 operatively coupled to the secondary winding N2. The primary winding N1 is coupled to the input voltage source 15. A feedback circuit 50 provides a first signal in response to the current through the load 12 and a second signal in response to the load voltage exceeding a threshold voltage. The power supply 10 of the present invention further includes a switch 30 for controlling the input current through the primary winding N1 of the first transformer 20 in response to the first and second signals. A second transformer 25 having a primary winding operatively coupled to the tertiary winding N3 of the first transformer 20 supplies a second current to the load 12 in response to the current through the tertiary winding N3.

9 Claims, 2 Drawing Sheets

DUAL MODE FLYBACK POWER SUPPLY

BACKGROUND OF THE INVENTION

1. Field of the Invention

The present invention relates to power supplies. More specifically, the present invention relates to power supplies which include flyback transformers.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Conventional ion and plasma sources typically include a DC actuated gas discharge chamber. Initially, a large voltage is applied to the gas chamber to effect an electron (plasma) discharge from the gas included therein. Prior to the plasma discharge the chamber draws minimal current and appears essentially as an open circuit. Following the plasma discharge the voltage across the chamber substantially decreases and the chamber conducts a relatively high current. It therefore follows that gas discharge chambers included within conventional ion and plasma sources display two distinct sets of electrical characteristics during the course of operation.

The disparity in the electrical parameters of the chamber before and after the initial plasma discharge generally necessitates utilization of a pair of individual power supplies. Specifically, both a high voltage/low current supply and a low voltage/high current supply are initially applied to the chamber. Each of the supplies may be realized, for example, by a conventional pulse width modulated flyback inverter supper. The turns ratio of a transformer included within each of the flyback inverters is appropriately adjusted to yield the desired electrical performance. The high voltage supply is responsible for providing the large voltage required to trigger the initial discharge of electrons within the gas. Following the plasma discharge the high voltage supply is disengaged leaving the low voltage/high current supply to power the chamber throughout steady state operation. In this manner separate power supplies, each designed to meet the power requirements of the gas chamber during a particular interval, are sequentially utilized during chamber operation.

Unfortunately, providing a pair of power supplies for each discharge chamber is generally expensive. Further, considerable complex auxiliary circuitry is required to engage and disengage the separate power supplies in response to the changing electrical characteristics of the discharge chamber. Moreover, during the time period between electron discharge within the chamber and deactivation of the high voltage supply a potentially large current runs through the chamber. The large curring during this transition interval results from the decrease in impedance of the gas chamber following plasma discharge. As a consequence, during the transition inerval the power dissipation of the chamber typically increases substantially. This added power dissipation also stresses the discharge chamber and the components associated therewith. Thus, the employment of a pair of individual power supplies to drive a single gas discharge chamber requires additional control circuitry and is generally expensive and inefficient.

Hence a need in the art exists for a single power supply capable of automatically transitioning between operational modes in responsee to changes in the impedance of a load connected thereto.

SUMMARY OF THE INVENTION

The need in the art for a single power supply capable of automatically transitioning between operational modes in response to changes in the impedance of a load connected thereto is addressed by the dual mode flyback power supply of the present invention. The dual mode power supply of the present invention includes an input voltage source for providing an input voltage and current. The power supply also includes a first transformer having primary, secondary and tertiary windings for supplying a first current to a load operatively coupled to the secondary winding. The primary winding is coupled to the input voltage source. A feedback circuit provides a first signal in response to the current through the load and a second signal in response to the load voltage exceeding a threshold voltage. The power supply of the present invention further includes a switch for controlling the input current through the primary winding of the first transformer in response to the first and second signals. A second transfer having a primary winding operatively coupled to the tertiary winding of the first transformer supplies a second current to the load in response to the current through the tertiary winding.

DETAILED DESCRIPTION OF THE INVENTION

Figure 1:
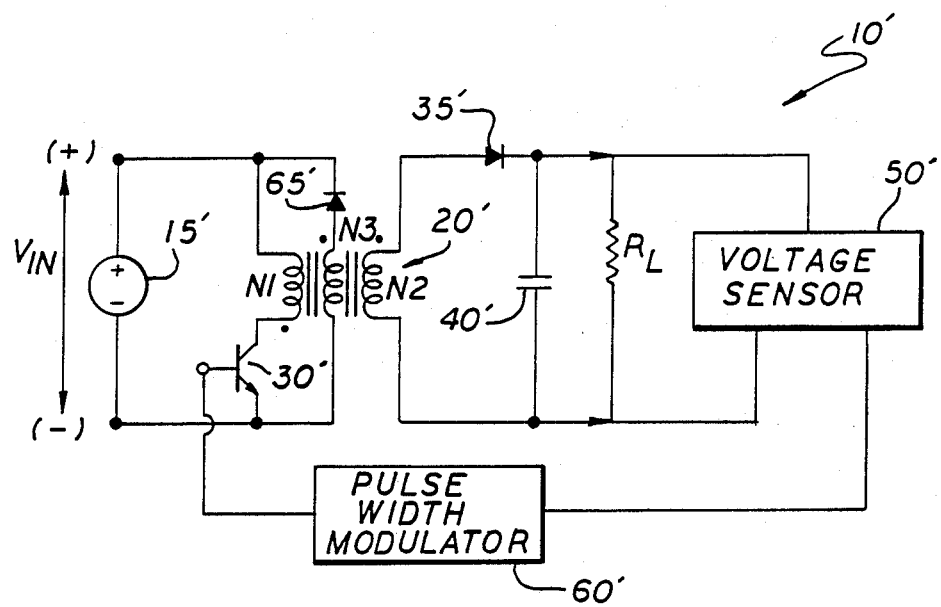
FIG. 1 shows a partially schematic, partially block diagrammatic representation of a conventional pulse width modulated flyback inverter power supply.

In order to fully appreciate the improvements offered by the dual mode flyback power supply of the present invention, the operation of a conventional flyback inverter power supply is briefly described. FIG. 1 shows a partially schematic, partially block diagrammatic representation of a conventional pulse width modulated flyback inverter power supply 10'. The conventional flyback supply 10' is driven by a voltage source 15' which provides an input voltage $V_{in}$. The energy stored within a transformer 20' coupled to the source 15' is adjusted by periodically pulsing a transistor switch 30'. By varying the energy stored within the transformer 20' during each cycle, the power delivered to a load $R_L$ is controlled and regulated.

The transformer 20' of the conventional supply 10' includes primary, secondary and tertiary windings N1, N2 and N3. The current through the primary N1, and therefore also through the secondary N2, is controlled by the transistor switch 30'. The secondary N2 provides current to a capacitor 40' and the load $R_L$ through a diode 35' during the intervals in which the switch 30' is nonconducting. In applications requiring the application of a constant load voltage, a voltage sensor (e.g. a potentiometer) 50' senses the voltage across $R_L$ and signals a pulse width modulator 60' accordingly. The pulse width modulator 60' generates an internal reference voltage which is compared with the output of the voltage sensor 50'. In response to this comparison, the period (width) of the "on" pulse applied to the transistor 30' is adjusted to appropriately regulate the current through the winding N1 and therefore through the winding N2. In this manner, the supply 10' is operative to maintain a relatively constant voltage across the load $R_L$ in response to variations in the impedance thereof.

Unfortunately, under conditions in which the impedance of the load $R_L$ becomes sufficiently large the voltage across $R_L$ tends to become higher than desired. This transient load voltage increase occurs with high impedance loads despite the feedback action provided by the pulse width modulator 60'. The winding N3 and diode 65' are included to prevent load voltage reflections through the transformer 20' from damaging the transistor switch 30'. That is, when the voltage across N3 exceeds $V_{in}$ the diode 65' conducts current back to the input voltage source 15'. This effectively clamps the maximum voltage across the load to a value determined by the turns ratio of N2 to N3. Hence, the maximum possible voltage across the load $R_L$ is limited by the winding N3 and diode 65'.

As mentioned in the Background of the Invention, gas discharge chambers included within conventional ion sources require significantly different values of voltage and current following the initial plasma discharge. The divergent power supply requirements engendered by the differing states of the discharge chamber have been met conventionally by connecting a pair of the supplies 10' in parallel to the discharge chamber. The discharge chamber is symbolically represented in FIG. 1 by $R_L$. Each of the supplies 10' are adjusted to meet the operating requirements of one of the states of the discharge chamber. The reference voltage within the modulator 60' and the turns ratio of the transformer 20' are adjusted to appropriately adapt each of the supplies 10' to service the chamber either before or after the initial plasma discharge. Nonetheless, as previously discussed this duplication of the supplies 10' is typically expensive and requires relatively complex control circuitry to engage the appropriate supply 10' in response to changes in the electrical characteristics of the gas discharge chamber.

Figure 2:
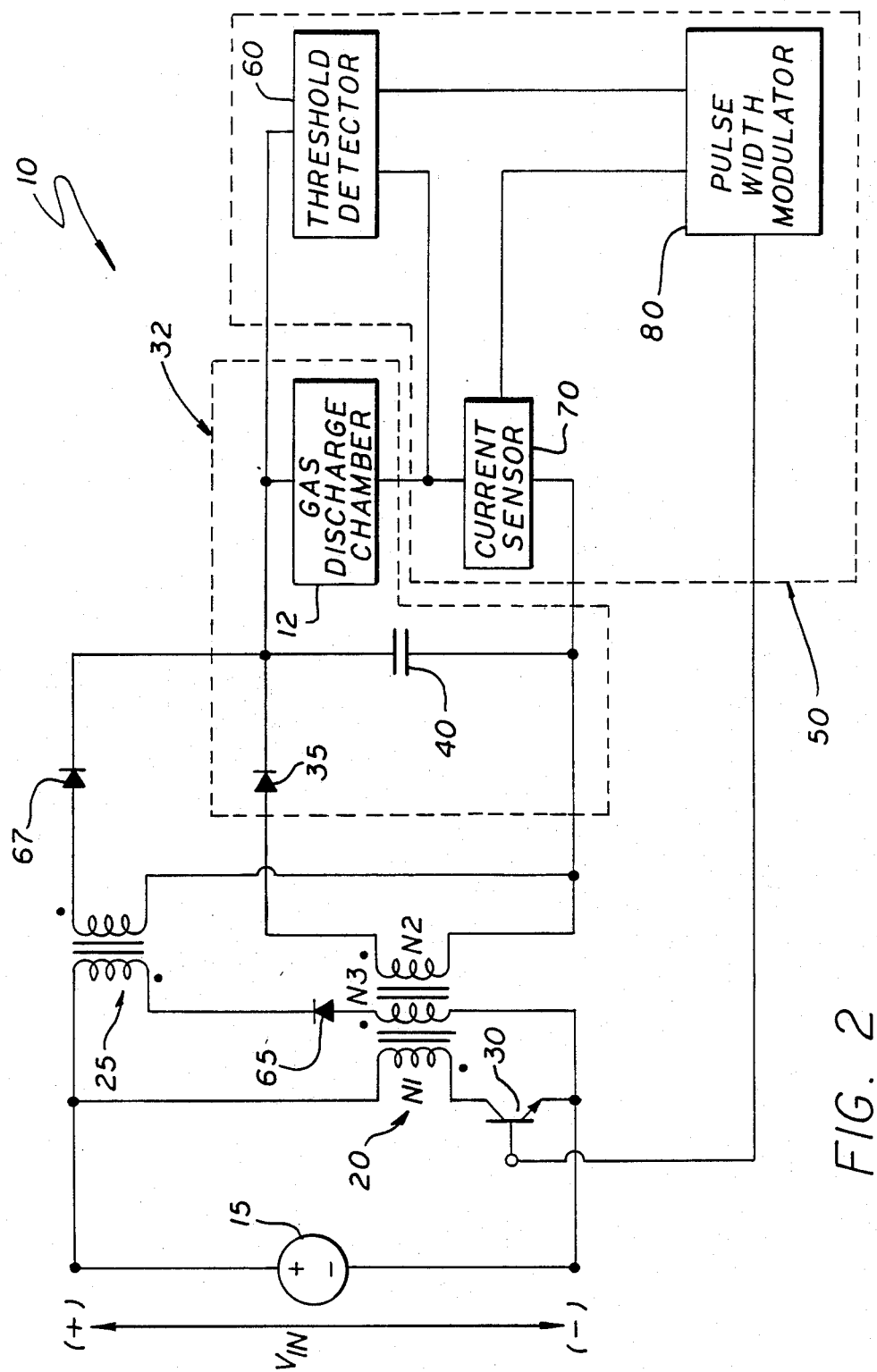
FIG. 2 shows a partially schematic, partially block diagrammatic representation of a preferred embodiment of the dual mode flyback power supply of the present invention.

The dual mode flyback power supply of the present invention substantially overcomes the difficulties mentioned above in connection with supplying power to a gas discharge chamber included within a conventional ion or plasma source. FIG. 2 shows a partially schematic, partially block diagrammatic representation of a preferred embodiment of the dual mode flyback power supply 10 of the present invention. The power supply 10 of the present invention includes a first transformer 20 and a second transformer 25 coupled thereto. A transistor switch 30 is coupled to the first transformer 20 while both of the transformers 20 and 25 are coupled to an output circuit 32. The output circuit 32 and the switch 30 are linked by a feedback circuit 50. In the embodiment of FIG. 2 the power supply 10 drives a load which comprises a gas discharge chamber 12 included within the open circuit 32. As previously discussed, the chamber 12 effectively appears as an open circuit prior to the occurrence of a plasma discharge therein. The supply 10 of the present invention impresses a regulated discharge voltage across the chamber 12 sufficiently large to effect a plasma discharge by charging a capacitor 40. Following plasma discharge the impedance of the chamber 12 is substantially reduced. Accordingly, the supply 10 feeds a regulated current to both the capacitor 40 and the chamber 12 to maintain a relatively constant steady state operational voltage across the chamber 12. Hence, the dual mode flyback power supply 10 of the present invention operates in primarily either a high voltage or constant current mode in accordance with the impedance of the chamber 12.

As shown in FIG. 2 the power supply 10 of the present invention is driven by a voltage source 15. The voltage source 15 impresses a constant voltage $V_{in}$ upon the supply 10 and provides the current required thereby. The voltage source 15 is directly coupled to the first transformer 20. The transformer 20 includes primary, secondary and tertiary windings N1, N2 and N3. The primary winding N1 is wound oppositely with respect to the secondary and tertiary windings N2 and N3. Although in FIG. 2 the turns ratio N1:N2:N3 is chosne to be 1:1:1, the turns ratio may be adjusted as necessary when other loads are substituted for the gas discharge chamber 12. The transformer 20 is also coupled to a second transformer 25, to a transistor switch 30, and to an output circuit 32. In embodiments such as that shown in FIG. 2 the transformer 20 may be realized, for example, by a 60 watt #62936 flyback transformer available from Pulse Engineering.

The current through the primary winding N1, and therefore also through the secondary winding N2, of the first transformer 20 is controlled by the transistor switch 30. The switch 30 is periodically pulsed "on" in by the feedback circuit 50. While the switch 30 is turned on, energy is stored within the transformer 20 due to the current flow through the primary winding N1. A diode 35 prevents current flow through the secondary winding N2 while the switch 30 is on. After the switch 30 is turned off, current flow through N1 ceases and energy is transferred to the output circuit 32 via current conduction by N2. In this manner the power delivered to the output circuit 32 from the first transformer 20 is controlled by adjusting the intervals during which the switch 30 is turned on. In the embodiment of FIG. 2 a bipolar transistor, such as a 2N6547 bipolar for example, is incorporated into the supply 10 to serve as the switch 30. However, it is understood that the switch 30 may be realized with other similarly rated bipolar transistors as well as with MOSFET's such as an IRF250.

The output circuit 32 includes the diode 35, the capacitor 40 and the gas discharge chamber 12. As is known in the art, a plasma discharge may be effected within the chamber 12 by the application of a large discharge voltage thereto, typically on the order of 300 to 1000 volts. Prior to the plasma discharge the chamber 12 conducts essentially no current. As a result, the discharge voltage is effected by charging the capacitor 40 with current from the first and second transformers 20 and 25. The value of the capacitor 40 is adjusted to control the rate at which the voltage across the chamber 12 ramps to the desired discharge voltage. Following the plasma discharge the impedance of the chamber 12 is significantly reduced and steady state operation commences during which current is supplied to both the capacitor 40 and the chamber 12 by the first transformer 20 while the diode 35 is conducting. While the diode 35 is nonconducting, the current requirements of the chamber 12 are met by the capacitor 40. In the embodiment of FIG. 2, the diode 35 is chosen to have current handling capability commensurate with that of a 1N5816 high current diode. Hence the output circuit 32 serves the dual purpose of impressing a large discharge voltage across the chamber 32 and, in the steady state, of supplying a relatively constant current thereto.

The feedback circuit 50 includes a threshold detector 60, a current sensor 70 and a pulse width modulator 80. The threshold detector 60 is connected in parallel with the discharge chamber 12 and is operative to limit the voltage across the chamber 12 prior to the occurrence of the initial plasma discharge therein. In the preferred embodiment, the threshold detector 60 would include a Zener diode (not shown) having a breakdown voltage approximately equal to the voltage (typically 300 to 1000 volts) required to induce a plasma discharge within the chamber 12. The Zener diode would limit the voltage across the chamber 12 by conducting current when the discharge voltage is exceeded. A current-to-voltage converter (not shown) would be included within the threshold detector 60 to convert the Zener current into a control voltage which would be applied to the pulse width modulator 80. Those skilled in the art having access to the present teachings will be able to implement a suitable threshold detector in accordance with the above scheme or in accordance with other known techniques.

The current sensor 70 typically includes a small resistor connected in series with the chamber 12. The pulse width modulator 80 taps the voltage across this series connected resistor to determine the current through the chamber 12. Hence the voltage across the chamber 12 is held at a desired voltage prior to the discharge therein by the threshold detector 60. Similarly, following plasma discharge the current sensor 70 allows the pulse width modulator 80 to control the switch 30 such that a relatively constant current is induced to flow through the chamber 12.

The pulse width modulator 80 periodically pulses the base of the transistor switch 30 to control the current through the primary winding N1 of the transformer 20. The modulator 80 adjusts the "width" or duration of the pulses applied to the switch 30 in response to the control voltages generated by the threshold detector 60 and current sensor 70. For example, during steady operation following the initial plasma discharge the modulator 80 adjusts the pulse width provided to the transistor 30 in response to the control voltage provided by the current sensor 70. In this manner the current through the chamber 12 is regulated by controlling the current flow through the first transformer 20. In the embodiment of FIG. 1 the pulse width modulator 80 operates at a constant frequency of typically between 20 and 50 kHz. It should be understood that the supply 10 of the present invention is not limited to operation within this frequency range. Pulse width modulators meeting the specifications set forth above are commercially readily available.

The second transformer 25 enables the supply 10 to generate a voltage across the discharge chamber 12 of sufficient magnitude to induce a plasma discharge therein. For example, as mentioned above the chamber 12 initially appears essentially as an open circuit prior to the occurrence of a plasma discharge. Current from the first transformer 20 charges the capacitor 40 which causes the voltage across the chamber 12 to increase. Eventually the voltage across the tertiary winding N3 of the first transformer 20 exceeds $V_{in}$ and the diode 65 coupled thereto conducts current to the primary winding of the second transformer 25. The current through the primary winding of the transformer 25 induces a current to flow in the secondary winding thereof. The current flowing through the secondary winding is delivered to the capacitor 40 through a third diode 67. In this manner the voltage across the chamber 12 increases until the threshold voltage of the threshold detector 60 is exceeded. As discussed above the threshold detector 60, the pulse width modulator 80 and the switch 30, then act to regulate the voltage across the chamber 12 about the threshold voltage until the initial plasma discharge occurs. The voltage across the chamber 12 then substantially decreases to a steady state operational voltage following the initial plasma discharge therein. The input voltage $V_{in}$ is generally chosen to be greater than the steady state chamber voltage to reverse bias the diode 65 and prevent current from flowing within the second transformer 25. In this manner the second transformer 25 is effectively automatically decoupled from the remainder of the supply 10 following the plasma discharge within the chamber 12. The turns ratio selected for the transformer 25 varies with respect to the discharge voltage of the chamber 12. For example, in the specific embodiment of FIG. 2 the transformer 25 may be realized by a Pulse Engineering Corp. ferrite inverter step-up transformer #6185 having a turns ratio of 18:1.

It is therefore a feature of the present invention that it automatically switches and provides either a voltage regulated supply of power to a load or a current regulated supply of power to a load in response to a change in the impedance thereof. In the application described above wherein the load includes the discharge chamber 12, this feature enables the power supply 10 to independently satisfy the power requirements of each operational mode of the chamber 12. As discussed in the Background of the Invention a separate, externally controlled conventional power supply is typically required for each operational mode of typical two terminal gas discharge chambers. Hence, by obviating the need for power supply duplication and external control circuitry the dual mode power supply 10 of the present invention offers advantages with respect to conventional power supplies in certain variable load applications.

Figure 3:
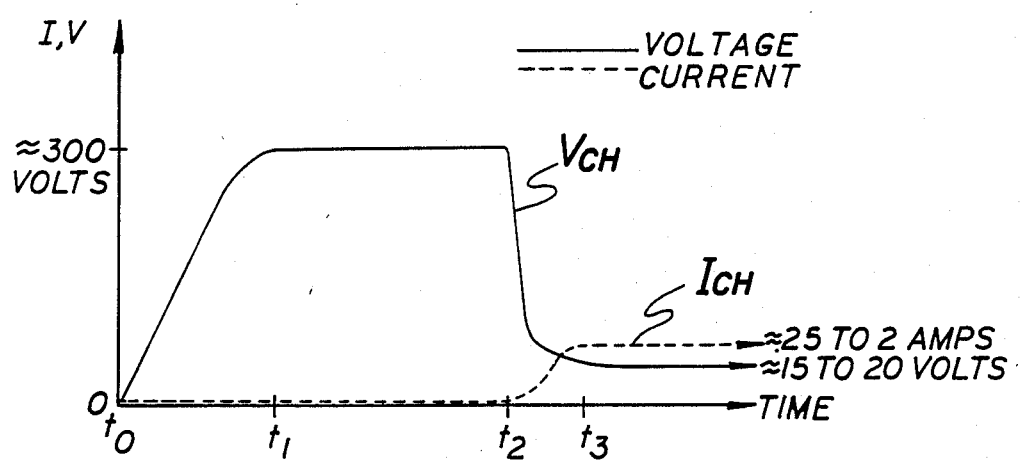
FIG. 3 is a graph of the current and voltage as a function of time through a gas discharge chamber coupled to a preferred embodiment of the power supply of the present invention.

The dual mode operation of the embodiment of the present invention shown in FIG. 2 is further described with reference to FIG. 3. Specifically, FIG. 3 is a graph of the current and voltage of the discharge chamber 12 as a function of time. At time $t_o$ the source 15 is activated and impresses a voltage $V_{in}$ of approximately 28 volts upon the supply 10. At time $t_o$ the current sensor 70 does not detect current flow through the chamber 12 and accordingly signals the pulse width modulator 12 to increase the width of the pulses applied to the switch 30. The ensuing onset of current through the first transformer 20 and subsequent charging of the capacitor 40 induces the voltage across the chamber 12 $V_{CH}$ to rise as shown in FIG. 3. The voltage across the winding N3 eventually exeeds $V_{in}$ as a result of the increasing voltage across the chamber 12 thereby causing current to flow through the second transformer 25. The transformer 25 then supplies current through the diode 67 to the capacitor 40 until the threshold voltage of the detector 60 is reached (typically 300 to 1000 volts) at time $t_1$.

As described above the detector 60 limits the voltage across the chamber 12 and signals the modulator 80 that the desired chamber discharge voltage has been reached. In response, the modulator 80 controls the current delivered to the capacitor 40 and detector 60 from the transformers 20 and 25 by controlling the width of the pulses applied to the switch 30. In this manner the supply 10 establishes a regulated discharge voltage across the chamber 12.

At time $t_2$ a plasma discharge occurs within the chamber 12 which results in a reduction in the impedance thereof. Accordingly, as shown in FIG. 3 the voltage across the chamber 12 decreases while the current therethrough increases. As the voltage across the chamber 12 decreases the voltage across the winding N3 eventually becomes less than $V_{in}$. At this time the diode 65 becomes reverse biased and prevents current flow through the transformer 25. In addition, the current through the chamber 12 $I_{CH}$ is regulated about a steady state value after time $t_3$ through the feedback action of the current sensor 70, pulse width modulator 80 and transistor switch 30. Thus, it should be apparent that the power supply 10 of the present invention is adapted to automatically transition between voltage and current regulation modes in response to changes in the impedance of the chamber 12.

Thus the present invention has been described with reference to a particular embodiment in connection with a particular application. Those having ordinary skill in the art and access to the teachings of the present invention will recognize additional modifications and applications within the scope thereof. For example, the turns ratios of the transformers and the feedback circuit may be altered to supply power to loads having impedance characteristics differing from those of gas discharge chambers. Further, the invention is not limited to the particular voltage and current sensing arrangement utilized within the feedback circuit disclosed herein. Those skilled in the art will appreciate that the principles of the invention may be extended to other circuits or devices for sensing voltage, current or power across a load coupled thereto. In addition, methods other than pulse width modulation may be employed to control the current through the transformers in response to impedance variations of the load without departing from the scope of the present invention. It is therefore contemplated by the appended claims to cover any and all such modifications, applications and embodiments.

Accordingly,
What is claimed is:
1. A dual mode flyback power supply comprising:
   input voltage source means for providing an input voltage and an input current;
   first transformer means including a transformer having primary, secondary and tertiary windings, for supplying a first current to a load operatively coupled to said secondary winding, said primary winding being coupled to said input voltage source means;
   feedback circuit means for providing a first signal in response to the current through said load and for providing a second signal in response to said load voltage exceeding a threshold voltage;
   switch means for controlling said input current through said primary winding in response to said first and second signals; and
   second transformer means coupled to said tertiary winding for supplying a second current to said load in response to the current through said tertiary winding.

2. The power supply of claim 1 wherein said feedback circuit means further includes current sensor means for generating said first signal in response to the current through said load.

3. The power supply of claim 2 wherein said feedback circuit means further includes threshold detector means for generating said second signal in response to the voltage across said load exceeding said threshold voltage and for preventing said load voltage from exceeding said threshold voltage.

4. The power supply of claim 3 wherein said feedback circuit means further includes pulse width modulator means for pulsing said switch means in response to said first and second signals.

5. The power supply of claim 1 wherein said second transformer means includes a second transformer having primary and secondary windings, said primary winding of said second transformer being operatively coupled to said tertiary winding of said first transformer and said secondary winding of said second transformer being operatively coupled to said load.

6. The power supply of claim 1 further including a diode coupling said load to said secondary winding.

7. The power supply of claim 6 further including a capacitor connected in parallel with said load.

8. A dual mode power supply comprising:
   a first transformer having a primary, a secondary and a tertiary winding, said primary winding being wound in a first direction and said secondary and tertiary windings being wound in a second direction;
   means for supplying a voltage and a current to said first transformer;
   a transistor switch coupled to said primary winding of said first transformer;
   a second transformer having oppositely wound primary and secondary windings;
   a first diode coupled to said tertiary winding of said first transformer and to said primary winding of said second transformer;
   an output circuit coupled to said secondary winding of said second transformer, said output circuit including a capacitor and a load connected in parallel;
   a second diode for coupling said secondary winding of said firsyt transformer to said output circuit;
   a threshold detector circuit coupled to said output circuit;
   current sensing means for sensing the current through said load; and
   a pulse width modulator coupled to said transistor, to said threshold detector and to said current sensing means.

9. A method of supplying power to a load comprising the steps of:
   a. providing an input voltage and an input current;
   b. supplying a first current to an output circuit in response to said input current, said output circuit including said load;
   c. generating a first signal in response to the voltage across said load exceeding a threshold voltage;
   d. generating a second signal in response to the current through said load;
   e. controlling said input current in response to said first and second signals; and
   f. supplying a second current to said output circuit in response to said input current and said voltage across said load.

* * * * *